United States Patent
Reiger

(10) Patent No.: US 10,278,335 B2
(45) Date of Patent: May 7, 2019

(54) FABRIC GROWING TROUGH

(71) Applicant: High Caliper Growing, Inc., Oklahoma City, OK (US)

(72) Inventor: Kurt E. Reiger, Oklahoma City, OK (US)

(73) Assignee: High Caliper Growing, Inc., Oklahoma City, OK (US)

( * ) Notice: Subject to any disclaimer, the term of this patent is extended or adjusted under 35 U.S.C. 154(b) by 161 days.

(21) Appl. No.: 15/419,774

(22) Filed: Jan. 30, 2017

(65) Prior Publication Data

US 2018/0213727 A1    Aug. 2, 2018

(51) Int. Cl.
*A01G 9/02* (2018.01)
*A01G 9/28* (2018.01)

(52) U.S. Cl.
CPC .............. *A01G 9/028* (2013.01); *A01G 9/02* (2013.01); *A01G 9/28* (2018.02)

(58) Field of Classification Search
CPC .... A01G 9/0128; A01G 9/029; A01G 9/0291; A01G 9/0295; A01G 9/02; A01G 9/021; A01G 9/026
See application file for complete search history.

(56) References Cited

U.S. PATENT DOCUMENTS

| | | | | |
|---|---|---|---|---|
| 1,912,914 A | * | 6/1933 | O'Brien | A01G 9/028 47/56 |
| 4,574,522 A | | 3/1986 | Reiger et al. | |
| 4,888,914 A | | 12/1989 | Reiger | |
| 5,103,588 A | | 4/1992 | Reiger | |
| 5,167,092 A | | 12/1992 | Reiger | |
| 5,393,313 A | | 2/1995 | Reiger | |
| 5,768,825 A | | 6/1998 | Reiger | |
| 6,202,348 B1 | | 3/2001 | Reiger | |
| 6,612,072 B2 | * | 9/2003 | Busby | A01G 9/029 47/65.8 |
| 8,429,852 B1 | * | 4/2013 | Fula | A01G 9/026 47/65.7 |

(Continued)

FOREIGN PATENT DOCUMENTS

KR    20140147511 A  * 12/2014  ............ A01G 9/026

OTHER PUBLICATIONS

Article entitled "Nursery Performance of Selected Shade-Tree Species Grown in 'Field-Grow' Fabric Containers," by W. R. Remphrey, S. R. Rimmer and M. J. Blouw, Canadian Journal of Plant Science, vol. 70, pp. 337-343 (Jan. 1990).

(Continued)

*Primary Examiner* — Kristen C Hayes
(74) *Attorney, Agent, or Firm* — McAfee & Taft

(57) ABSTRACT

A growing trough is provided. The growing trough comprises a fabric bottom, a fabric outer wall, and a fabric partition. The fabric outer wall extends upward from the peripheral edge of the fabric bottom. The fabric partition is attached only at opposed edges thereof to the fabric outer wall preventing buckling of the fabric outer wall and equal load distribution when growing media is dumped into the growing trough. The fabric is a porous fabric that catches plant roots and directs the roots into the growing trough thereby preventing root circulation and inducing root branching within the growing trough.

12 Claims, 3 Drawing Sheets

(56) References Cited

U.S. PATENT DOCUMENTS

| | | | | |
|---|---|---|---|---|
| 8,826,590 | B2* | 9/2014 | Cross | A01G 9/026 47/65.8 |
| 8,950,110 | B2* | 2/2015 | Fula | A01G 9/026 47/65.7 |
| 9,155,252 | B2* | 10/2015 | Setzer | A01G 9/28 |
| 2002/0048415 | A1* | 4/2002 | Derby | B65D 88/1631 383/119 |
| 2002/0121720 | A1* | 9/2002 | Davies | B29C 70/081 264/103 |
| 2003/0029080 | A1* | 2/2003 | Busby | A01G 9/029 47/65.8 |
| 2006/0111481 | A1* | 5/2006 | Pearson | C08K 5/34 524/100 |
| 2013/0193148 | A1* | 8/2013 | Fula | B65D 25/04 220/520 |
| 2013/0255148 | A1* | 10/2013 | Setzer | A01G 9/28 47/33 |

OTHER PUBLICATIONS

Root Control Bag Growing System brochure entitled, "The Tapered Bag" (undated but admitted to be prior art).
Drawings of a prior art growing trough (updated but admitted to be prior art).

* cited by examiner

FABRIC GROWING TROUGH

The present disclosure generally relates to fabric pots, and more specifically to fabric growing troughs.

BACKGROUND

Nurseries and other plant growers use a variety of methods for growing plants. Growing in containers is exceedingly common. Nursery containers are most often made of plastic. Also used to make nursery containers are ceramic, tin and pressed peat. All such containers are hard sided. Hard-sided containers are easy to move and transport. Almost all rigid containers are non-air permeable and non-water permeable. The only air and water permeable areas are the open top and the various drain holes that may be cut into the bottom or lower sides of the rigid container. The root structures of plants grown in rigid, non-permeable containers will circle, resulting in a poor quality plant when transplanted, and in certain cases, the death of the plant. Drainage is also a problem in rigid containers because other than drainage holes, such containers are not porous. Hard-sided containers also trap and hold heat, resulting in a growing area too hot for ideal plant growth. One solution to this problem has been the development of soft-sided fabric containers in which plants can be grown above ground. These fabric containers are air and water permeable because they are made of porous fabric. These fabric containers greatly reduce or eliminate root circling. They also release heat buildup in the container and allow moisture movement and evaporation through the container walls.

In recent years, the popularity of raised bed gardening has continued to grow. Traditionally, raised beds are rectangular in shape and allow for several plants to be contained together or an entire garden to be created. However, traditional raised beds are constructed from lumber, stone, brick or other non-porous rigid materials and lack the benefits of fabric containers. Once constructed, such raised beds are not portable, and are generally meant to be permanent installations. They are often non-air permeable, non-water permeable, and sometimes lack sufficient draining means.

SUMMARY OF THE INVENTION

The current disclosure is directed to a growing trough, which may also be referred to as a fabric raised bed. The growing trough comprises a fabric bottom, a fabric outer wall, and at least one fabric partition. The fabric outer wall extends upwardly from the peripheral edge of the fabric bottom. The at least one fabric partition is attached only at opposite edges thereof to the fabric outer wall. The fabric bottom, fabric outer wall, and fabric partition wall are all porous.

The fabric outer wall may comprise first and second opposed sidewalls and first and second opposed end walls that extend upwardly from the fabric bottom. The fabric partition may be connected at opposite edges thereof to the first and second opposed sidewalls. The fabric bottom and the first and second opposed sidewalls may be formed from a single, unstitched piece of fabric. The fabric partition is not connected at its lower edge to the fabric bottom, and there is a space defined between the lower edge of the fabric partition and the fabric bottom. The space beneath the partition allows media used to fill the fabric raised bed to pass beneath the fabric partition. As a result filling the fabric raised bed is more efficient and easier than if no such space existed.

The fabric may be made up of a non-woven, needle-punched fabric. The non-woven, needle-punched fabric may be made up of continuous fibers or staple cut fibers selected from the group consisting of polyethylene, polypropylene, polyvinylchloride, polystyrene, polyolefin, polyamide, polyurethane, polyester, and mixtures thereof. For example, in one embodiment the fabric may comprise a staple cut polypropylene fiber. The fabric may be heat bonded on one side such that the outer surface of the fabric bottom, the outer surface of the fabric outer wall, and a single surface of the fabric partition are smooth and stiff. The growing trough may be generally rectangular in shape. The growing trough is air and water permeable.

In an alternative embodiment, the growing trough may comprise a rectangular fabric bottom, two opposed fabric sidewalls, two opposed fabric end walls, and a plurality of fabric partitions. The two opposed fabric sidewalls and two opposed fabric end walls extend upwardly from the peripheral edge of the rectangular fabric bottom. The rectangular fabric bottom and the two opposed fabric sidewalls may be formed from a single, unstitched piece of fabric. The plurality of fabric partitions extend between and connect only to the two opposed fabric sidewalls. In one embodiment, the fabric partitions are spaced upwardly from the fabric bottom.

The rectangular fabric bottom, two opposed fabric sidewalls, two opposed fabric end walls, and plurality of partitions are porous.

DETAILED DESCRIPTION

Figure 1A:
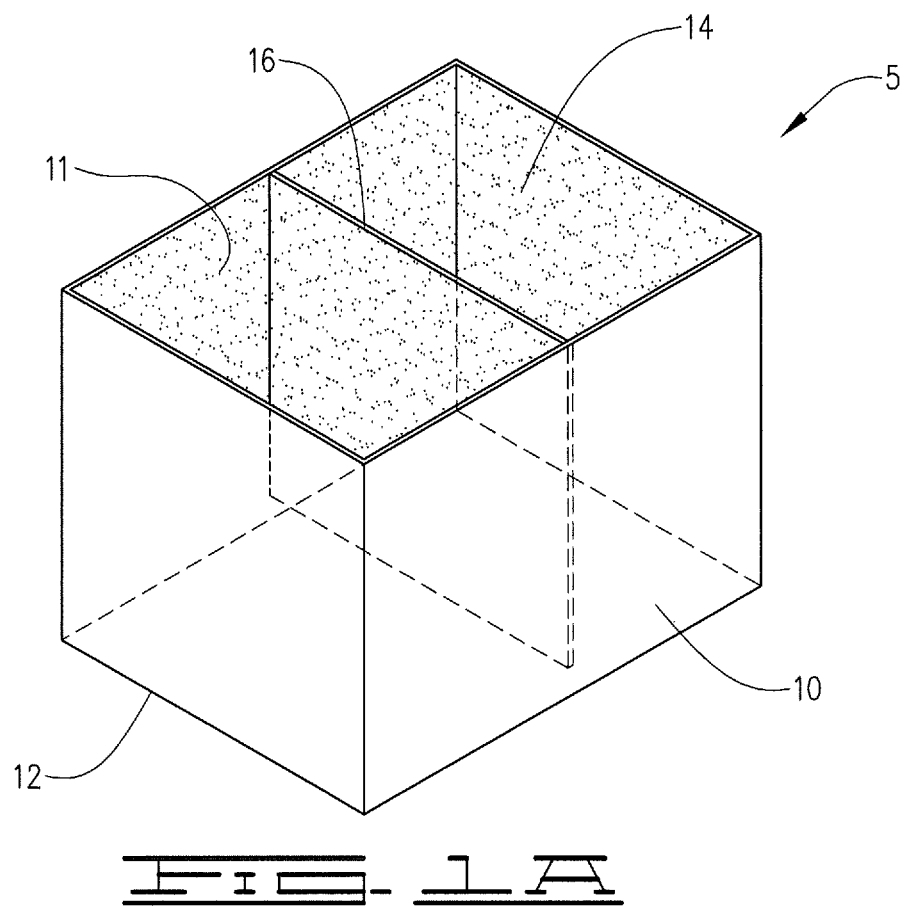
FIG. 1A is a perspective view of an embodiment of a growing trough provided by the present disclosure.

The present disclosure may be understood more readily by reference to the Figures and this detailed description. For simplicity and clarity of illustration, where appropriate, reference numerals may be repeated among the different figures to indicate corresponding or analogous elements. In addition, numerous specific details are set forth in order to provide a thorough understanding of the various embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 1B:
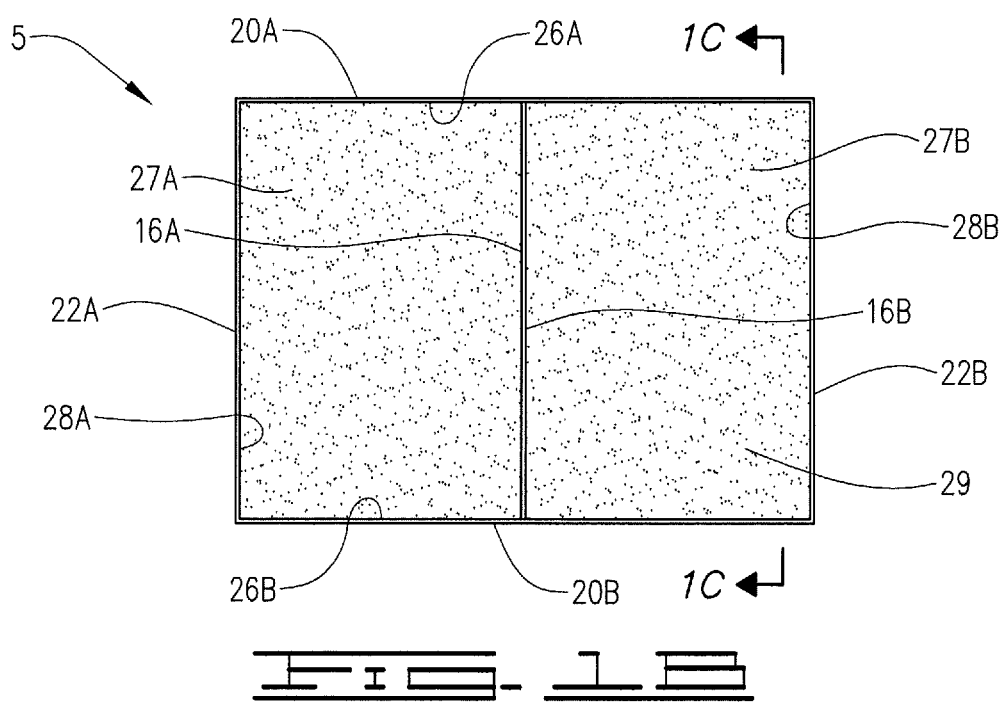
FIG. 1B is a top view of an embodiment of a growing trough provided by the present disclosure.
Figure 1C:
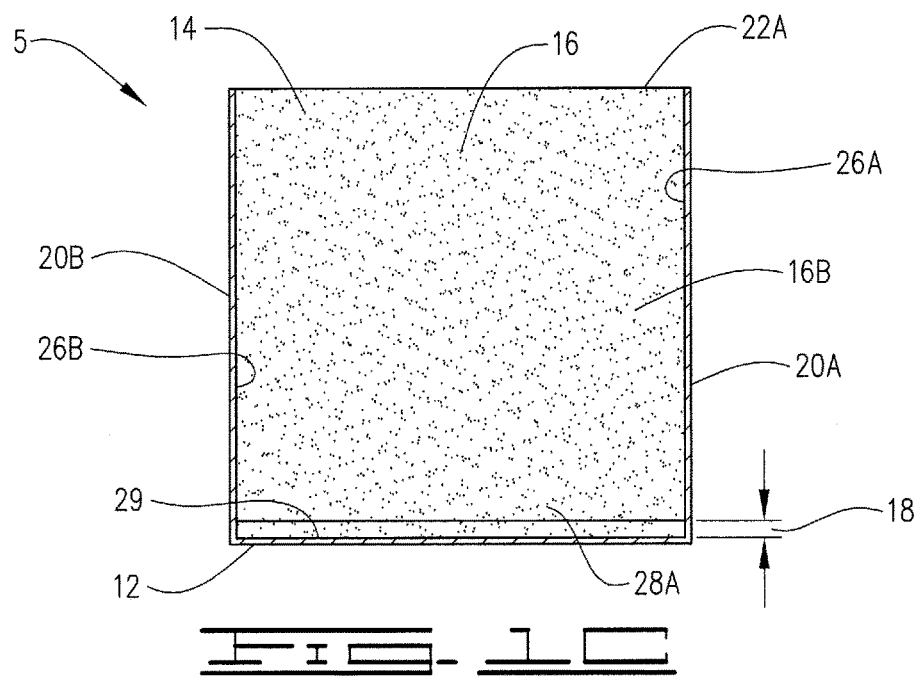
FIG. 1C is a section view of an embodiment of a growing trough provided by the present disclosure.

Referring now to the drawings and particularly to FIGS. 1A-1C, an embodiment of a growing trough, or raised fabric bed 5 of the present invention is illustrated. Growing trough 5 comprises an outer wall 10, a bottom 12, a top opening 14 defined by outer wall 10, and a partition 16. Outer wall 10 extends upward from the peripheral edge of bottom 12. Outer wall 10 and bottom 12 have inner surfaces 11 that are rough or fuzzy so that root tips that grow into outer wall 10 and bottom 12 are trapped. Partition 16 is attached only at opposed edges thereof to outer wall 10, such that a small space 18 may exist between partition 16 and bottom 12.

Partition 16 prevents outer wall 10 from buckling when growing media is placed in growing trough 5. Because partition 16 is not connected to bottom 12 and space 18 is provided, the manufacturing time of growing trough 5 is reduced over growing troughs in which a partition is connected to the bottom. In addition, partition 16 allows for an equal load distribution pattern. Space 18 is such that growing media used to fill growing trough 5 will pass therethrough under partition 16. As a result the growing trough 5 is easy to fill evenly to create a rectangular, stable fabric raised bed. Although the height of space 18 may vary, in one embodiment the space 18 is about two inches.

In some embodiments, outer wall 10 may comprise first and second opposed sidewalls 20A and 20B and first and second opposed end walls 22A and 22B that extend upward from bottom 12. Partition 16 may be connected at the opposed edges thereof to the first and second opposed sidewalls 20A and 20B. Partition 16 should have a top edge that reaches, or very nearly reaches the top edges of opposed sidewalls 20A and 20B. In the disclosed embodiment fabric partition 16 is spaced equidistant from opposed end walls 22A and 22B. The partition 16 thus divides the growing trough 5 into two equal sized compartments 27A and 27B. Bottom 12 and the first and second opposed sidewalls 20A and 20B may be formed from a single, unstitched piece of fabric. Outer wall 10 defines top opening 14 through which a growing media may be delivered into growing trough 5. Although the drawings indicate that the top edge of partition 16 reaches the top edges of opposed sidewalls 20A and 20B, it is understood that the overall height of fabric partition 16 may be such that the top edge of the fabric partition 16 may be slightly below the top edges of opposed sidewalls 20A and 20B. In one embodiment the top edge of fabric partition 16 may be about two inches below the top edges of opposed sidewalls 20A and 20B.

All, or any of bottom 12, opposed side walls 20A and 20B, opposed end walls 22A and 22B, and partition 16 may be formed of a fabric, for example a porous, non-woven, needle-punched fabric. The porous, non-woven, needle-punched fabric may be comprised of fibers which are tangled and knotted as a result of being needle punched. This creates a rough or fuzzy surface capable of trapping, or catching plant roots, but restricts and curtails penetration of the fabric by the roots. The fabric is preferably heat-bonded on the outer surface thereof to create a smooth surface which provides stiffness to outer wall 10 and bottom 12. Inner surface 11 will be the rough or fuzzy surface, such that the roots of a growing plant may be trapped and directed back into growing trough 5.

A suitable needle punched fabric for use in accordance with this invention is formed of staple fibers. The fabric of staple fibers can be fawned using fibers of polyolefin, polyester, polyamide or mixtures thereof. A staple cut fiber fabric for forming growing trough 5 may be a heavy (for example 6 ounces or heavier) fabric formed of polypropylene staple fibers which is strongly heat bonded on one side. The heat bonded side of the fabric is placed on the outside of growing trough 5 with the non-heat bonded, rough or fuzzy, side making up inner surface 11 to catch root tips, induce root branching and prevent root circulation.

Heavy needle punched fiber fabrics which are formed of continuous fibers can also be utilized in accordance with this invention. For example, non-woven needle-punched fabrics Ruined of continuous polyolefin fibers, polyester fibers and/or polyamide fibers can be used. As in the case of staple fiber fabrics, the continuous fiber fabrics are preferably 6 ounces or heavier and are fused by heating after being tangled and knotted by needle punching to provide strength for resisting root penetration and for resisting the enlargement of those roots that do penetrate the fabric.

Another fabric suitable for use in accordance with this invention is formed of woven continuous fibers. The woven continuous fibers form a substrate and, prior to being needle punched, one or more layers of staple fibers are placed on the substrate. The staple fibers and substrate are then needle punched, whereby the staple fibers are attached to one side of the substrate forming a highly fuzzy surface thereon.

The staple cut fibers are preferably selected from the group consisting of polyolefin fibers, polyester fibers, polyamide fibers and mixtures thereof. Most preferably, both the continuous fibers and staple fibers are formed of polypropylene. When the resulting fabric is utilized to form growing trough 5 in accordance with the present invention, the rough or fuzzy surface is placed on the inner surface 11 of growing trough 5 whereby root tips are readily caught therein and prevented from circulating within growing trough 5. Inner surface 11 comprises inner surfaces 26A and 26B of side walls 20A and 20B, inner surfaces 28A and 28B of end walls 22A and 22B, and inner surface 29 of bottom 12. The entire inner surface 11 may be a rough or fuzzy surface, or selected portions thereof, including any or all of inner surfaces 26A, 26B, 28A, 28B and 29. Both sides 16A and 16B of partition 16 can be rough or fuzzy, or smooth. Growing trough 5 may be air and water permeable. Air permeability allows growing trough 5 to release heat buildup. Water permeability allows moisture movement and evaporation through outer wall 10 of growing trough 5. These characteristics allow for the plant to breathe while in growing trough 5.

Thus, growing trough 5 of the present invention can be formed of staple or continuous fibers, or both, selected from polyolefin fibers, polyester fibers and/or polyamide fibers. It is preferred that the fiber fabric utilized be a heavy fabric which has been tangled and knotted by needle punching to the degree that the fabric has great strength and promotes root pruning. Some of the root tips growing within the fabric will not penetrate the fabric and will root prune or laterally branch. Other roots may slightly penetrate the porous fabric and hit the outside air. These roots will air root prune, branching laterally inside the trough. Where the fabric is in contact with the ground, some roots may penetrate the porous fabric. These roots will be choked, or girdled, by the fabric and root pruning or lateral root branching will ensue. As indicated, increased strength can be imparted to the fabric by heat bonding the fibers. Because the roots are captured by the fabric, the apical dominance of the roots that encounter the fabric is stopped, and lateral root branching, or root pruning, will occur within growing trough 5. Therefore, a fibrous root system within growing trough 5 will be created. Because of the root branching, which takes place in growing trough 5, the plant, if transplanted, will re-establish itself and anchor itself quickly and effectively. The air root pruning and root branching results in healthier, stronger plants than those grown in hardsided containers or beds Growing trough 5 is generally rectangular. In the embodiment illustrated in FIGS. 2A-2C, growing trough 30 comprises outer wall 32, a rectangular bottom 40, a top opening 44, and partitions 42A and 42B. Outer wall 32 is comprised of two opposed sidewalls 34A and 34B and two opposed end walls 36A and 36B. Top opening 44 is defined by fabric sidewalls 34A and 34B and fabric end walls 36A and 36B. Sidewalls 34A and 34B extend upward from the peripheral edge of rectangular bottom 40. Rectangular bottom 40 and sidewalls 34A and 34B may be formed from a single, unstitched piece of fabric. End walls 36A and 36B extend upward from the peripheral edge of rectangular bottom 40. Rectangular bottom 40, sidewalls 34A and 34B, and end walls 36A and 36B may all have inner surfaces 46 that are rough or fuzzy so that root tips are trapped within growing trough 30. Partitions 42A and 42B extend between and are connected only to sidewalls 34A and 34B. Partitions 42A and 42B may be spaced upwardly from bottom 40 such that a space 38 is provided. Space 38 is a small space, and will be slightly above bottom 40. In the embodiment described the space 38 will allow media to pass thereunder when the trough 30 is filled. In one embodiment the space 38 is about two inches. The space 38 allows media to flow therethrough, which provides for an efficient easy fill, and a stable raised bed when full of media.

Figure 2A:
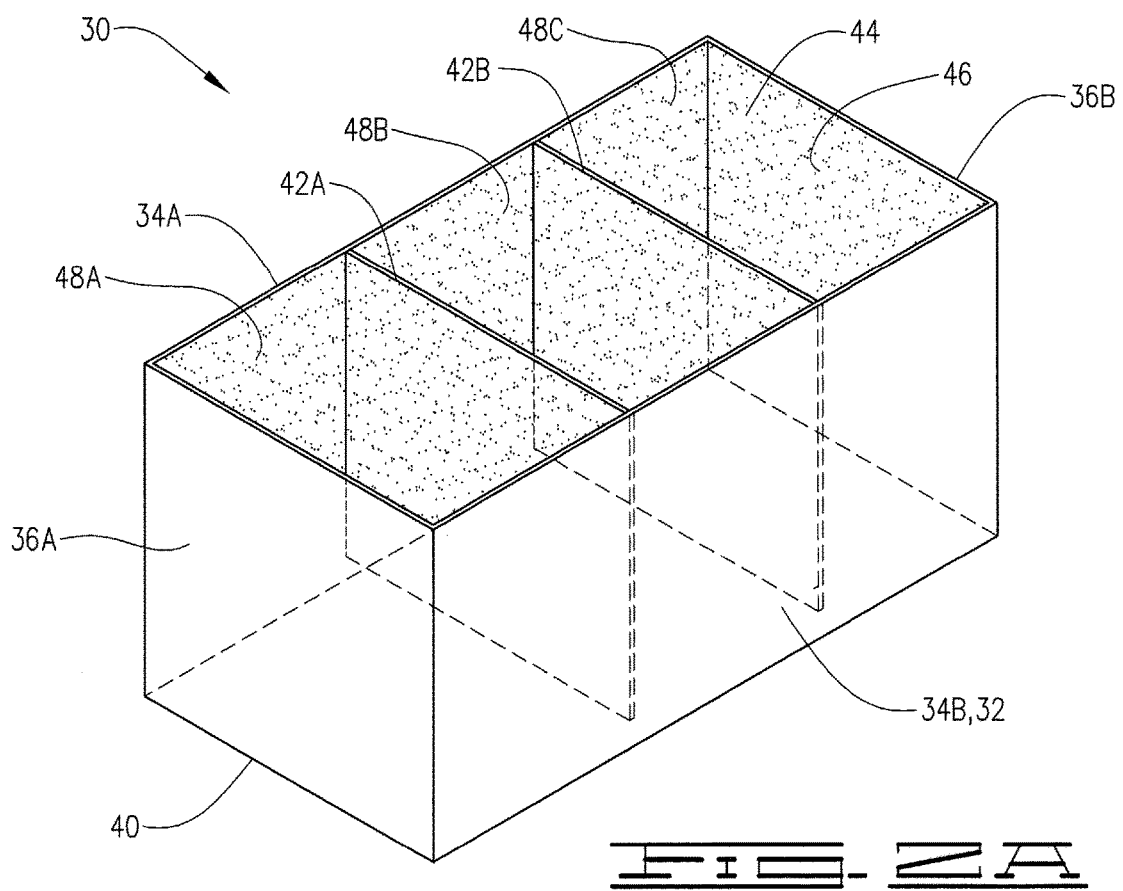
FIG. 2A is a perspective view of an embodiment of a rectangular growing trough provided by the present disclosure.
Figure 2B:
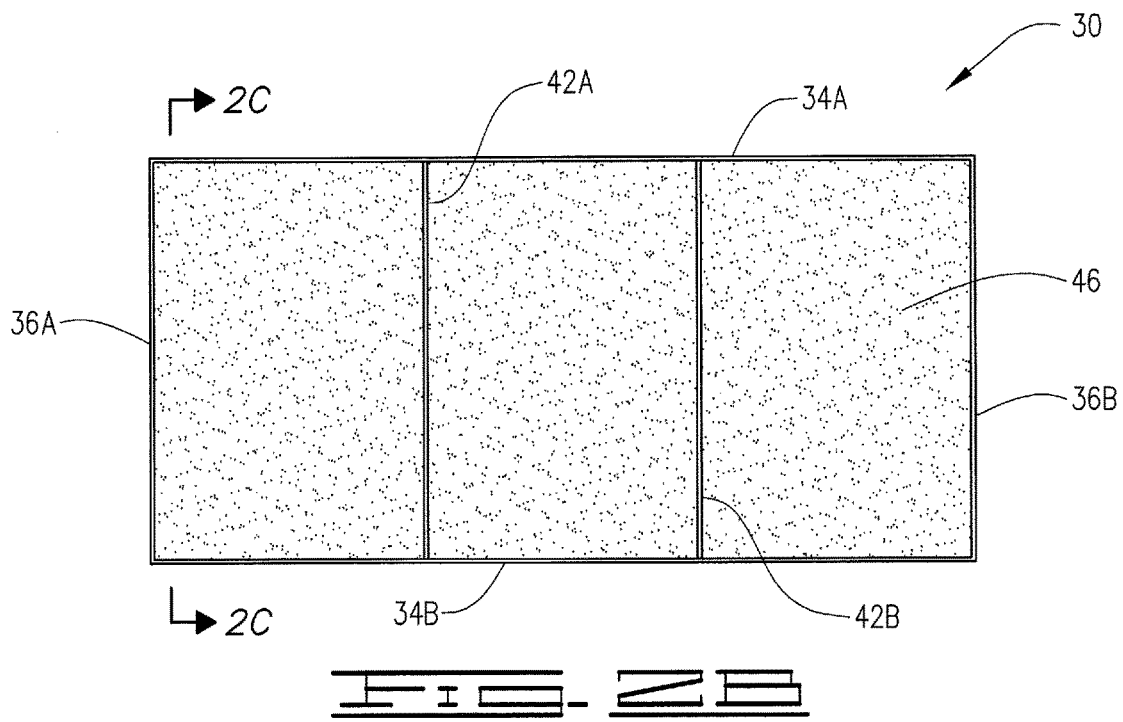
FIG. 2B is a top view of an embodiment of a rectangular growing trough provided by the present disclosure.
Figure 2C:
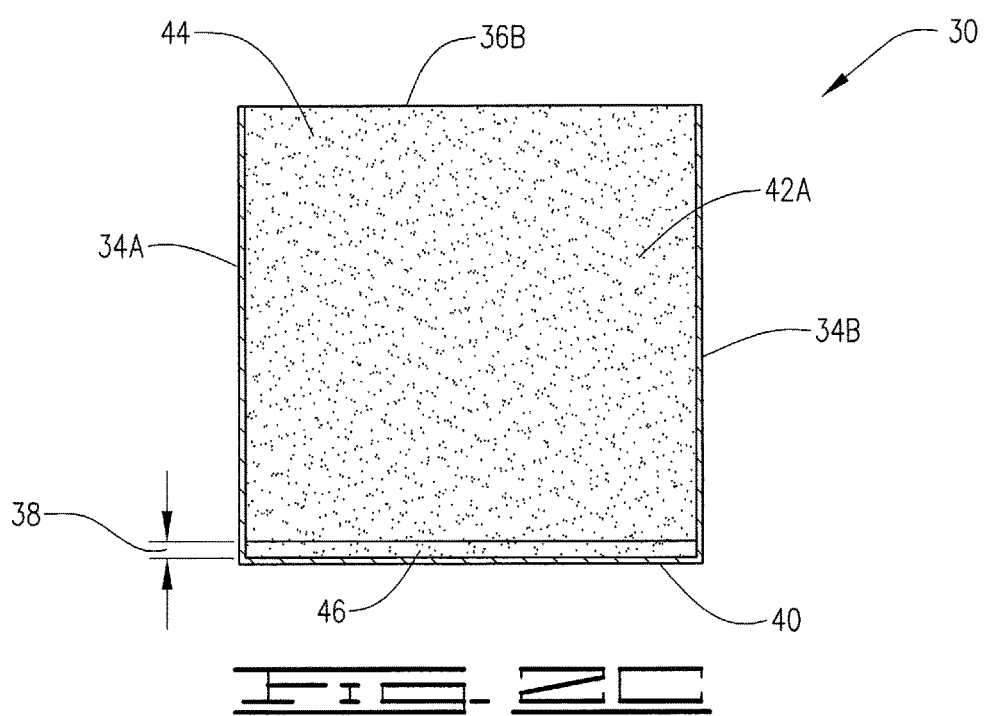
FIG. 2C is a section view of an embodiment of a rectangular growing trough provided by the present disclosure.

In the embodiment shown, partitions 42A and 42B will reach or very nearly reach the top edges of opposed side walls 34A and 34B. It is understood however, that the height of partitions 42A and 42B may be such that the top edges of the partitions 42A and 42B are below the top edges of sidewalls 34A and 34B. In one example the top edges of fabric partitions 42A and 42B may be about two inches below the top edges of sidewalls 34A and 34B. In the embodiment of FIGS. 2A-2C the fabric partitions 42A and 42B are spaced equally between end walls 36A and 36b. The fabric partitions 42A and 42B divide the growing trough 30 into three equal sized growing compartments 48A, 48B and 48C. Such spacing provides for a stable raised bed, or trough with proper load distribution. In the embodiment disclosed the width and length of the compartments 48A, 48B and 48C are substantially identical. Such an arrangement balances the load from the fill media, and aides in preventing the walls of the growing trough 30 from bulging and/or flopping.

Rectangular bottom 40, side walls 34A and 34B, end walls 36A and 36B and partitions 42A and 42B of growing trough 30 may be formed of a porous, non-woven, needle-punched fabric. The porous, non-woven, needle-punched fabric is comprised of fibers which are tangled and knotted as a result of being needle punched. This creates a rough or fuzzy surface capable of trapping, or catching plant roots, but restricts and curtails penetration of the fabric by the roots. The fabric is preferably heat-bonded on the outer surface thereof to create a smooth surface which provides stiffness to sidewalls 34A and 34B, end walls 36A and 36B, and rectangular bottom 40. The inner surfaces 46 of the side walls 34A and 34B, end walls 36A and 36B, and bottom 40 may all have the rough or fuzzy surfaces such that roots of the growing plant may be trapped thereby. The trough described herein provides for a fabric raised bed garden. The fabric raised bed has the advantages of a fabric container, such as root pruning and heat release as described herein. Unlike a raised bed constructed from lumber or other material the fabric raised bed described is easy to use, easy to fill and when not in use, is foldable and easily stored. In addition, the fabric raised bed is portable, in that it can be folded and carried easily. Fill media can be easily dumped, so that the fabric raised bed may be stored and reused any number of times.

The fabric utilized for the embodiment of FIGS. 2A-2C may be like that described with respect to the embodiment of FIG. 1. It is understood that while the particular embodiments disclosed include one and two partitions, any number of partitions may be used with the growing trough to provide the desired stability, and to alleviate any buckling. The fabric partitions may be spaced apart equally between the two ends of the fabric raised bed. Because of the construction of the fabric raised bed, or trough described herein, the rectangular shape can be maintained when filled with media, even though raised bed is made from a fabric. A fabric raised bed as described herein will hold its shape, will not flop over when filled, and will provide a stable raised bed garden. The space beneath the partitions though which media may flow and the equidistant spacing of the fabric partitions aides in maintaining proper shape and stability. The fabric growing trough has no rigid supports, or other external support structure, since the configuration provides for a steady, stable raised bed with a rectangular shape.

Thus, it is seen that the apparatus of the present invention readily achieves the ends and advantages mentioned, as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A growing trough comprising:
   a rectangular fabric bottom;
   two opposed fabric sidewalls extending upwardly from the peripheral edge of the rectangular fabric bottom, wherein the rectangular fabric bottom and the two opposed fabric sidewalls are formed from a single unstitched piece of fabric;
   two opposed fabric end walls extending upwardly from the peripheral edge of the rectangular fabric bottom; and
   a plurality of fabric partitions extending between and connected only to the two opposed fabric sidewalls, the rectangular fabric bottom, the two opposed fabric sidewalls, the two opposed fabric end walls and the plurality of fabric partitions comprising a non-woven, needle-punched fabric comprising staple cut fibers.

2. The growing trough of claim 1, the plurality of fabric partitions having opposed side edges, wherein the partitions are connected to the two opposed fabric sidewalls at the side edges thereof.

3. The growing trough of claim 2, wherein each of the fabric partitions is spaced upwardly from the fabric bottom, and wherein fill media may flow beneath the fabric partitions.

4. The growing trough of claim 3, wherein a top edge of each of the fabric partitions is spaced downwardly from top edges of the opposed fabric sidewalls.

5. The growing trough of claim 1, wherein the fabric partitions are equally spaced between the two fabric end walls.

6. The growing trough of claim 1, wherein the fabric partitions divide the growing trough into equal sized growing compartments.

7. The growing trough of claim 6 wherein a length and width of the equal sized growing compartments is substantially identical.

8. A growing trough comprising:
   a rectangular fabric bottom;

a fabric outer wall extending upwardly from the fabric bottom; and at least one fabric partition attached at opposed edges thereof to the fabric outer wall and spaced upwardly from the fabric bottom, wherein the fabric comprises a fuzzy surface comprised of tangled and knotted fibers configured to catch plant roots and prevent root circling.

9. The growing trough of claim 8 comprising a plurality of fabric partitions connected at the outer edges thereof to the fabric outer wall, wherein a lower edge of each of the fabric partitions is spaced upwardly from the rectangular fabric bottom.

10. The growing trough of claim 9 wherein the plurality of fabric partitions divide the growing trough into a plurality of generally identically shaped growing compartments.

11. The growing trough of claim 9 wherein the fabric outer wall comprises:

first and second side walls; and first and second end walls, the plurality of partitions being connected at the outer edges thereof to the first and second side walls.

12. The growing trough of claim 8 configured to maintain a rectangular shape when filled with growing media, with no additional external support structure.

* * * * *

UNITED STATES PATENT AND TRADEMARK OFFICE
CERTIFICATE OF CORRECTION

PATENT NO. : 10,278,335 B2
APPLICATION NO. : 15/419774
DATED : May 7, 2019
INVENTOR(S) : Kurt E. Reiger Page 1 of 1

It is certified that error appears in the above-identified patent and that said Letters Patent is hereby corrected as shown below:

In the Specification

Column 3, Line 61, delete "fawned" and insert --formed-- therefor;

Column 4, Line 6, delete "Ruined" and insert --formed-- therefor.

Signed and Sealed this
Sixth Day of August, 2019

Andrei Iancu
*Director of the United States Patent and Trademark Office*